(12) United States Patent  
Mintz

(10) Patent No.: US 8,356,024 B2  
(45) Date of Patent: Jan. 15, 2013

(54) SYSTEM AND METHOD TO RETRIEVE SEARCH RESULTS FROM A DISTRIBUTED DATABASE

(76) Inventor: Yosef Mintz, Jerusalem (IL)

( * ) Notice: Subject to any disclaimer, the term of this patent is extended or adjusted under 35 U.S.C. 154(b) by 57 days.

(21) Appl. No.: 13/126,209

(22) PCT Filed: Oct. 27, 2009

(86) PCT No.: PCT/IB2009/054757  
§ 371 (c)(1),  
(2), (4) Date: Apr. 27, 2011

(87) PCT Pub. No.: WO2010/049889  
PCT Pub. Date: May 6, 2010

(65) Prior Publication Data  
US 2011/0208713 A1   Aug. 25, 2011

Related U.S. Application Data

(60) Provisional application No. 61/108,599, filed on Oct. 27, 2008, provisional application No. 61/177,540, filed on May 12, 2009.

(51) Int. Cl.  
*G06F 7/00* (2006.01)

(52) U.S. Cl. ..................................... 707/706

(58) Field of Classification Search ............... 707/705, 707/706, 713, 719, 999.104, 999.004  
See application file for complete search history.

(56) References Cited

U.S. PATENT DOCUMENTS

| | | | |
|---|---|---|---|
| 5,532,702 A | 7/1996 | Mintz | |
| 5,987,446 A * | 11/1999 | Corey et al. | ............... 1/1 |
| 6,437,743 B1 | 8/2002 | Mintz et al. | |
| 6,734,823 B2 | 5/2004 | Mintz et al. | |
| 7,831,626 B1 * | 11/2010 | Depelteau | ......... 707/797 |
| 7,987,205 B1 * | 7/2011 | Depelteau | ......... 707/802 |
| 2007/0016614 A1 * | 1/2007 | Novy | ......... 707/104.1 |
| 2007/0109262 A1 * | 5/2007 | Oshima et al. | ......... 345/156 |
| 2007/0136264 A1 * | 6/2007 | Tran | ............. 707/4 |
| 2008/0065591 A1 * | 3/2008 | Guzenda | ............. 707/2 |

OTHER PUBLICATIONS

International Preliminary Report on Patentability for International Application No. PCT/IB2009/054757 mailed on May 12, 2011; 9 pages.  
International Search Report and the Written Opinion for International Application No. PCT/IB2009/054757 mailed on Mar. 18, 2010; 15 pages.

* cited by examiner

*Primary Examiner* — Hung T Vy  
(74) *Attorney, Agent, or Firm* — Shichrur & Co.

(57) ABSTRACT

Some demonstrative embodiments include devices, systems and/or methods of retrieval of information from a distributed database, e.g., using distributed computation as a search engine.

18 Claims, 9 Drawing Sheets

Search Data Flow

Response in a priority Mapping Phase

Priority Assignment to communication slots for the example model depicted in Fig 2

Example of time division Priority assignment to Communication Slots

Time Slots

Example of Time-Frequency division Priority assignment to Communication Slots

Time Slots

Priority Assignment to communication slots for the example model depicted in Fig 2a Example of time division Priority assignment to Communication Slots Time Slots Example of Time-Frequency division Priority assignment to Communication Slots Time Slots

SYSTEM AND METHOD TO RETRIEVE SEARCH RESULTS FROM A DISTRIBUTED DATABASE

CROSS REFERENCE TO RELATED APPLICATIONS

This application is a National Phase Application of PCT International Application No. PCT/IB2009/054757, International Filing Date Oct. 27, 2009, which claims the benefit of U.S. Provisional Application No. 61/108,599, filed Oct. 27, 2008, and U.S. Provisional Application No. 61/177,540, filed May 12, 2009, the entire disclosures of which are incorporated herein by reference.

FIELD OF THE INVENTION

Retrieval of information from a distributed database using distributed computation as a search engine.

BACKGROUND

Current search engines have to tackle problems associated with large increasing databases and high quality of search results, while maintaining short response time to queries.

SUMMARY

Retrieval of information from a distributed database, using distributed computation as a search engine, can be quite efficient with a limited level of distribution. Distributed computation, in this respect may relate, for example, to a cluster of servers used to implement distributed computation or to any other parallel computation that implements distributed search computation.

An example of an application that can take benefit from parallel computation is a search engine for Internet data items. In this respect distributed search can be performed on a locally updated storage that stores an image of Internet data items and/or stored indexed image of Internet data items. In terms of computer science said image of data items may refer to "cache" and said indexed image may refer to an indexed cache. Such data can be stored as a distributed database on a plurality of database servers through which data items are extracted according to priorities determined by search criteria.

In context of the present invention distributed computation is used interchangeably with parallel computation.

Parallel computation may contribute to the search time and to the update rate of large databases as, for example, the said Internet image of data items and/or indexed data items. In this respect improvement in the efficiency of the search can be measured by the level of the distribution that may contribute to shortening the time of a search and to increasing the update rate of the distributed database.

Current search engines have to tackle problems associated with large increasing data bases and high quality of search results, while maintaining short response time to queries.

A high level of search, in which a much higher demand for parallel processing is required may, for example, relate to indexing enrichment by semantic search or even to on line semantic search that may provide higher levels of relevance and precision.

In the Internet, for example, an expected need for a major increase in the level of distributed computation relates to the challenge to tackle the deep web size, preferably with more natural language to retrieve information of relevance, that is, providing not just a limited level of weighted surface web URLs as an output for keyword inputs but also higher level of information retrieval capability characterized by higher relevance and higher precision to both the surface and the deep web.

Distributed computation that enables load balancing might be considered as a major means to tackle these problems, while efficient search algorithms and enriched indexing are considered to be the complementary means.

In this respect, it might be expected that any increase in the level of search complexity, the size of the database, and the need for tackling higher dynamic data, may take benefit from load balancing provided by a higher level of distributed computation.

However, distributed computation is most efficient when a process performed by one computer is independent of processes performed by the other computers. In a search application when the independence is limited the benefit from distributed computation is limited. This relates to partial search results, created by independent search processes according to a common search query, which have to be merged into a single list of interrelated search results ranked according to priorities.

This is a process which is required even if search results are created and sorted by each server independently, for example, according to the level of a match with search criteria.

In order to create a final list of search results, ranked according to priorities, transmission of independent search results from said servers to a common server is required. In this respect a common process may create prioritized interrelation among all the search results and provide a final list of search results sorted according to priorities. However, a highly distributed database that is aimed to shorten the time of a search according to a query, by a parallel search process, may convert the problem of a lengthy search process, performed by a few database servers, to a lengthy time consuming communication problem of a search performed by a large number of database servers.

In a hypothetical situation if the highest priority data items are found by a known server and the subsequent lower priority items are found by another known server and so forth, then the parallel search by a large number of servers can be an ideal approach to shorten the search time by load balancing.

However, as mentioned above, this is not the situation and as a result there is the need for an exhaustive search to wait for the last data item, received by a common server from all the servers that found search results according to a query, before the common process is able to determine the first item in a final list of search results ranked according to priorities. That is, priorities to search results, determined according to the level of a match between the content of data items and search criteria, have to be sorted to provide relative priorities and therefore there is a need to have the whole picture first before an exhaustive search can provide the right priorities to data items found by a search process.

This in turn may create high communication overheads due to the large number of servers that have to transmit search results to a common server. In this respect, the overhead of the process of communication medium access control becomes a significant barrier to a highly distributed database.

A large number of servers that have unknown interrelated search results is an inherent cause for high communication medium access control overheads in transmitting their search results to a common server, while an unsuitable method to access the communication medium further increases the overheads. In this respect lack of knowledge about the relative share of the number of servers having search results may have a negative effect on the preferred method to transmit search results from said servers to a common server. For example, when the relative share of servers having search results is high, a contention based multiple access method, such as CSMA related method, is expected to have higher overheads than multiple access methods such as polling and token passing methods; whereas, polling and token passing methods may create high overheads when a high share of servers have no search results.

Lacking a priori knowledge about the preferred access method, may further limit the level of the database distribution, that is, the benefit from a parallel computation search will be limited to a low distribution by few database servers, for example, by making servers to be more dedicated to categorized data. Categorized data can be chosen according to predetermined fields of interest that are frequently used with queries. This may enable a priori knowledge about expected servers that may provide search results according to certain types of queries. However, for non or not sufficiently categorized queries, using complex search methods will either create high waiting time for search results to be found or high communication time overhead expected with a highly distributed database. Further to the direct effect on response time to a query this may also have indirect effect on the search time of other queries as the overall load on the system increases by each search process.

The term database server is used to refer to a search unit in a distributed search system that utilizes multiple database search units. In this respect a database search unit is not limited to a stand alone server and it may also refer to other implementation models such as to a mainframe that implements distributed search through its parallel computation.

Some systems and methods may, to a certain extent, enable overcoming one or more of the above mentioned limitations, that is, to overcome the need of waiting for the last item of search results from said distributed search servers, before being able to determine the first item in a final list of search results ranked according to priorities, to overcome the high overhead problem due to an unsuitable method for transmitting search results from said servers to a common server, to overcome the high overhead of multiple access communication control for transmitting search results from a database to a common server.

This may be achieved by discriminating one or small number of database servers according to a preliminary priority mapping, as further described. With such a system and methods, the objective is to enable lowering the medium access control overhead of multiple access communication methods and to update a common server by the highest priority search results before lower priority search results.

This involves a non-straight forward approach, since priorities of search results are relative in nature and are given to information items a posteriori and not a priori before all search results are received and sorted by a common server.

Prioritized transmissions from database servers that found search results are determined preferably by a preliminary priority mapping of severs according to their search results. In a preliminary priority mapping process the search results are not transmitted to a common server but a signal transmission by a database server in a certain communication slot is by itself indicative on the level of a match between search criteria and information items found by a transmitting server.

In a preliminary priority mapping process, if data such search results would be transmitted in a communication slot, then the benefit from such communication slots might be counter productive (not mentioning lack of optimal throughput). The reason for this is that a communication slot is meant to be used preferably for the purpose of providing indication about an existing or non existing transmission in it. Transmission in a communication slot in this respect provides indication about search results that match a priority level that is distinguishable from other priority levels. Therefore a signal transmission in a communication slot, allocated and assigned for database servers according to the level of a said match, is preferably a signal, such as a non data modulated signal. Such a signal is preferably being limited to be indicative on response or lack of response to priority assigned to a communication slot. The objective is to minimize communication resources for a signal transmission, while a signal is detectable according to the received energy. This enables a possibility to detect for a minimum cost of communication resources a meaningful indication even if more than one signal is transmitted in a communication slot. As a result the receiver is enabled to map valid search results according to priorities associated with different communication slots.

A preliminary priority mapping process may enable to identify existing search results in database servers according to priorities and accordingly to adjust an acceptable number of database servers to become associated with a priority level for data transmission of search results. A said acceptable number is a compromise between the objective to associate a single database server with a priority level, and the time it may take by a random multiple access method to enable transmission of search results by a plurality of database servers that have in common a priority level.

As further described the aim of a priority mapping process, in which signals are transmitted in communication slots associated with tentatively assigned priority levels is, on the one hand, to minimize unused communication resources that are the price for mapping valid priorities of search results and, on the other hand, to make prioritized transmission of search results more efficient by controlling the schedule and the number of servers that may further transmit search results according to valid priority levels. In order to minimize unused communication resources by priority mapping, due to the tentative association of communication slots with priority levels, a plurality of phases of low to high resolution discrimination of priority levels are preferably used by the priority mapping process. According to this method a priority level detected in a used communication slot of an early priority mapping phase having preferably lower discrimination resolution, will be refined by a further phase that may enable to determine priority levels having higher discrimination resolution for a said earlier priority level having lower resolution. Such a method may enable progressive refinement of discrimination of priority levels that under control can also be improved to detect a signal that its level is indicative on the sum of signals. An indication on the sum of the signals, for example through energy level detection, can be indicative of the number of databases that used the same communication slot.

As a result, some systems and methods may enable to shorten the response time to receive the highest priority search results, and/or further enable progressive creation of a prioritized list of search results.

According to this method parallel search that enables load balancing may use a highly exhaustive search with highly complex search methods, while maintaining rapid response time for the highest priority search results.

Furthermore, high level of parallel search computation may enable to further shorten search time according to a query with less dependence on categorized distribution of data in database servers.

In addition, higher level of parallel computation may further enable a search engine application to maintain more frequent updates, for example, updating Internet data items stored as an image of the Internet data and/or indexed data in a database distributed among a large number of database servers.

With such an approach, subject to sufficient priority discrimination levels, the larger the number of said servers, which may update their databases when they are not participating in a search process, the faster can be the update to the said image of data and/or indexed data, constructed as a distributed database among the said servers. As a result of such a process this may enable frequent ongoing changes of data to be tracked by frequent searches. This will preferably be refined by a cleaning post process that reduce or remove overlapping data on different servers due to new data updates.

Database servers that implement search processes according to high level methods, such as for example high level of indexing, semantic search, or any other complex method to improve the quality of search results, can take benefit of the parallel computation as suggested with the approach of the present invention.

In an embodiment, each database server is preferably equipped with sorting apparatus in order to construct a local sorted list of search results according to the level of a match between search criteria and the content of data in respective data items.

In an embodiment, a system for retrieving search results according to priorities from a plurality of database servers is comprised of a common server and database servers connected for example to a common network such as a LAN (Local Area Network) wherein each database server is associated with a local database.

In an embodiment a method of retrieving search results according to priorities from a plurality of database servers is used with parallel computation performed by a plurality of said servers for a common query, the method comprises:

i. receiving by a database server one or more search criteria related to a query, preferably criteria having a plurality of levels according to which search results are discriminated, ii. searching by a database server search results from a locally associated database according to a predetermined search process for said search criteria related to a query, iii. associating by a database server priority discrimination levels with search results, wherein priority discrimination levels are common to said plurality of database servers, and wherein a priority discrimination level refers to one or more search criteria that discriminate one or more search results from other search results, and wherein more restricting criteria are associated with higher priority discrimination levels, iv. transmitting by a database server for each priority discrimination level associated with search results, a signal in a respective communication slot assigned to a priority discrimination level for which the database server may associate one or more search results in stage (iii), and wherein transmission by database servers in a said communication slot is preferably a synchronized transmission performed simultaneously by database servers having in common a respective priority discrimination level, v. identifying by a database server indication on valid priority discrimination levels, wherein valid priority discrimination levels are detected by a detector that detects transmission performed within stage (iv) in different communication slots, and wherein transmission in a communication slot which is assigned to a priority discrimination level is indicative on a valid priority discrimination level, vi. transmitting by a database server search results associated with valid priority discrimination level according to priority determined by valid priority discrimination levels identified in stage (v).

According to an embodiment, a common server receives signals and data transmitted by database servers, and transmits queries and control messages to database servers, which control server may refer to a search control server when it is mentioned in relation to methods and system described herein.

In an embodiment, a common server communicates with said plurality of database servers through a LAN, to which the database servers are connected.

According to an embodiment, said search query in stage (i) is transmitted by a search control server to a plurality of said database servers preferably through a broadcast message.

According to an embodiment, said priority discrimination levels in stage (iii) are transmitted by a search control server to a plurality of database servers.

According to an embodiment, said priority discrimination levels, assigned to communication slots for signal transmission by database servers, are determined by a search control server and transmitted to a plurality of said database servers.

According to an embodiment, multi-carrier OFDM (Orthogonal Frequency Division Multiplex) based transmission is used to transmit multiple signals in stage (iv), wherein a sub-carrier of the multi-carrier may correspond to a said communication slot assigned to a priority discrimination level.

According to an embodiment, a common synchronization signal is received by the database servers to synchronize signals transmitted by database servers in stage (iv) and to which the receiver of the transmitted signals is preferably also synchronized.

According to an embodiment, identifying valid priority levels by stage (v) is according to detection results of a detector associated with the database server that may listen to transmitted signals performed in stage (iv) and accordingly said indication on valid priority levels are identified by database servers.

According to this embodiment, a refinement to priority discrimination levels is performed before stage (vi), as a further phase of preliminary priority mapping process, by repeating stages (iii) (iv) and (v), according to a process in the database servers that also determines new common priority discrimination levels assigned to communication slots.

According to an embodiment, identifying valid priority levels by stage (v) is according to detection results of a detector associated with the database server that may listen to transmitted signals performed in stage (iv) and accordingly said indication on valid priority levels are identified by database servers.

According to this embodiment, a further phase of preliminary priority mapping process and respective communication resources assignment is performed by each database server by repeating stages (iii) (iv) and (v) and according to a process common to the database servers that determines refined and preferably more restricted common priority discrimination levels for a subsequent preliminary priority mapping process phase.

According to an embodiment, identifying valid priority levels in stage (v) is performed by a common detector that detects transmitted signals performed in stage (iv).

According to an embodiment, a message with detected valid priority discrimination levels is transmitted to database servers after stage (iv) according to which database servers identify valid priority levels in stage (v).

According to an embodiment, if a subsequent phase of preliminary priority mapping process phase is performed then instead of transmitting valid priority levels to database servers a message with refined and preferably more restricted priority discrimination levels is transmitted to the database severs after stage (iv).

In an embodiment, said common detector and transmitter that transmits messages to database servers are associated with a common server that may serve as a search control server.

According to this embodiment, stages (iii) (iv) and (v) are repeated by a further phase of preliminary priority mapping process that determines new priority discrimination levels with higher resolution for a more restricted range of priority levels.

According to an embodiment, assignment of communication slots is received as a message by database servers before stage (iv), and accordingly stages (iii) and (iv) are repeated by a further phase of preliminary priority mapping process that determines new priority discrimination levels with higher resolution for a more restricted range of priority levels.

In an embodiment, communication slots, assigned to priority discrimination levels, are allocated dynamically to database servers.

According to an embodiment, prioritized communication in stage (vi) is be performed preferably according to a predetermined prioritized contention resolution based access method, wherein access priority is provided to database servers according to said valid priority discrimination levels.

In an embodiment, a search control server may be comprised of one or more servers possibly sharing more than one task of controlling the transmission of data items from database servers according to priorities.

In an embodiment, the tasks and respective processes of a said search control server may include:
1) receiving a query,
2) transmitting query related search criteria to database servers, preferably as a broadcast message,
3) mapping valid priority levels for said priority updates of database servers, including some or all of the following possible sub-stages:
   A. allocating communication slots for signals to be transmitted by transmitters associated with database servers according to priority levels of search results and transmitting a respective message to database servers that elaborates on and/or indicates priority levels assigned to the communication slots,
   B. detecting signals transmitted by database servers in communication slots, and mapping accordingly detected valid priority levels for search results found by database servers,
   C. subject to a need to increase the discrimination among valid priority levels, for example, when the number of database servers that are found to be associated with a valid priority level mapped in stage (B) is higher than the number that may enable desirable throughput of priority updates of database servers, in a further stage, then, repeating stages (A) and (B) to increase the priority resolution for such valid priority levels mapped by prior stages (A) and (B),
4) transmitting, or preferably broadcasting, to database servers a message that elaborates priority in transmission of priority updates by database servers to a common server according to valid priority levels mapped in stage (3). Said priority levels may be elaborated according to the criteria that priority levels were determined by database servers according to stage (A) or according to identification of communication slots in which signals were detected in one or more stages of (B) and for which database servers may store a reference related to communication slots in which they have transmitted signals,
5) receiving priority updates of database servers and sorting according to priority levels search results to construct a common priority update,
6) transmitting to the source that initiated the query and/or to an intermediate computer that may further handle the sorted search results,
7) According to a predetermined procedure, repeating stages (5) to construct one or more common priority updates, and respectively repeating stage (6) in order to complement the construction of and the transmission of a final sorted list of search results. In an embodiment of the invention, priority updates further to the first common priority update may be handled to construct a single sorted list of search results to complement the first common priority update in order to provide a final sorted list of search results. According to this embodiment a repeated stage (5) will receive search results having lower priority than search results of said first common priority update, transmitted by each database server before repeating stage (5) and stage (6) as part of stage (7). According to an embodiment of the invention the transmission by each server in a repeated stage (5) may include all, or at least more than, the search results related to priority updates other than the first priority update.

In an embodiment, complementary processes are performed in parallel by database servers that may comprise some or all of the following stages:
a) receiving a message with search criteria,
b) according to search rules, extracting from a locally associated database search results having a match between the content of data items and the search criteria according to a search process,
c) determining priority levels to search results found in stage (b) according to the level of the match between the data content of corresponding data items and search criteria and, preferably sorting the search results accordingly,
d) receiving a message, according to a predetermined protocol, that elaborates priority levels assigned to communication slots allocated to signal transmission by transmitters of database servers according to priority levels of search results, and determining accordingly one or more priority levels for signal transmission by a database server according to the best match between priority levels of its search results, determined in stage (c), and corresponding priority levels assigned to the allocated communication slot,
e) transmitting by a transmitter associated with a database server a signal in the communication slot assigned to the highest priority level according to priority levels determined in stage (d) for the database server, f) subject to a communication protocol that requires further transmission of a signal in one or more lower priority levels assigned with communication slots, transmitting in communication slots assigned to further priority levels a signal according to further priority levels determined in stage (d) for the database server, g) subject to a further stage of (d) repeating stage (e) and possibly (f) to increase the discrimination among priority levels further to a prior discrimination made by prior stages (d) to (e) and possibly (f), h) receiving a message that elaborates priority for transmitting search results by database servers according to valid priority levels that were detected by a common server according to transmission of signals in stage (e) and (f), i) transmitting search results to a common server according to priorities elaborated in stage (h).

FIG. 6 describes a stage transition diagram of stages described above for a search control server and for a database server. As further described some of the stages could be omitted and some could be merged with others and therefore FIG. 6 may be considered as a scenario that may further facilitate the description of other scenarios.

BRIEF DESCRIPTION OF THE FIGURES

For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements. The figures are listed below.

DETAILED DESCRIPTION

Figure 1:
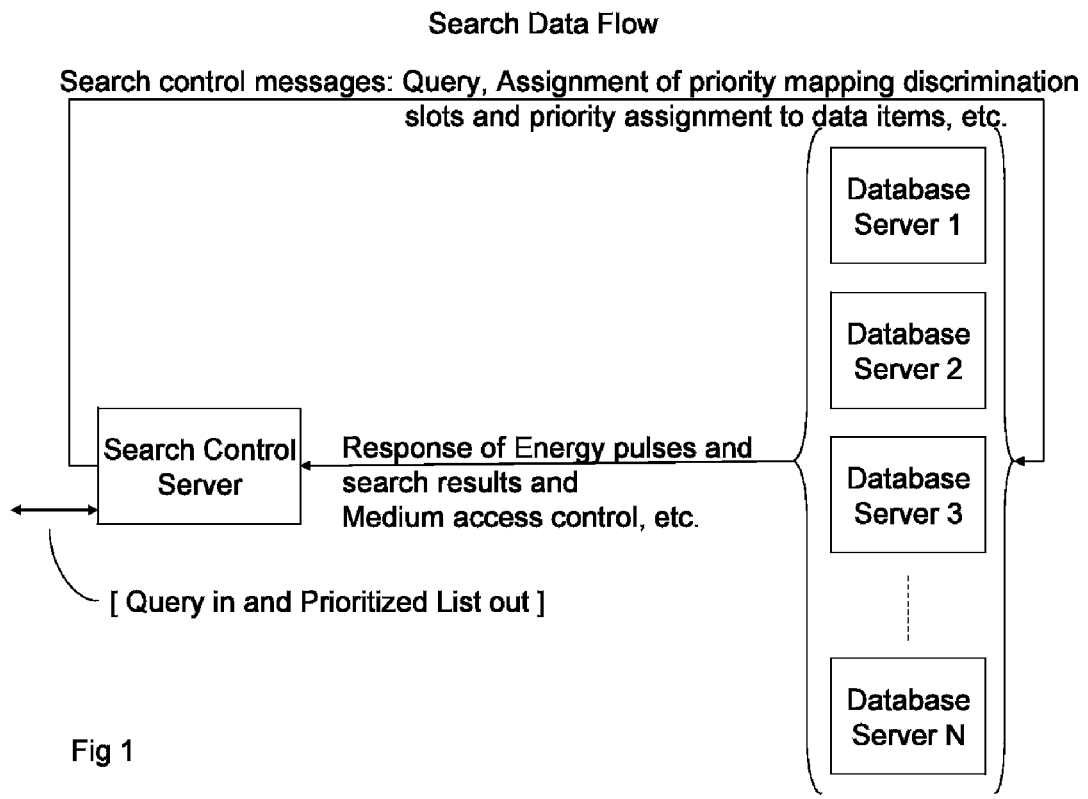
FIG. 1 shows basic data flow between a search control server and database servers and the signaling flow from database servers to a search control server, in accordance with some embodiments.

In the following detailed description, numerous specific details are set forth in order to provide a thorough understanding of some embodiments. However, it will be understood by persons of ordinary skill in the art that some embodiments may be practiced without these specific details. In other instances, well-known methods, procedures, components, units and/or circuits have not been described in detail so as not to obscure the discussion.

Discussions herein utilizing terms such as, for example, "processing", "computing", "calculating", "determining", "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

The terms "plurality" and "a plurality" as used herein include, for example, "multiple" or "two or more". For example, "a plurality of items" includes two or more items.

Some embodiments may be used in conjunction with various devices and systems, for example, a Personal Computer (PC), a desktop computer, a mobile computer, a laptop computer, a notebook computer, a tablet computer, a server computer, a handheld computer, a handheld device, a Personal Digital Assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless Access Point (AP), a wired or wireless router, a wired or wireless modem, a video device, an audio device, an audio-video (A/V) device, a Set-Top-Box (STB), a Blu-ray disc (BD) player, a BD recorder, a Digital Video Disc (DVD) player, a High Definition (HD) DVD player, a DVD recorder, a HD DVD recorder, a Personal Video Recorder (PVR), a broadcast HD receiver, a video source, an audio source, a video sink, an audio sink, a stereo tuner, a broadcast radio receiver, a flat panel display, a Personal Media Player (PMP), a digital video camera (DVC), a digital audio player, a speaker, an audio receiver, an audio amplifier, a gaming device, a data source, a data sink, a Digital Still camera (DSC), a wired or wireless network, a wireless area network, a Wireless Video Area Network (WVAN), a Local Area Network (LAN), a Wireless LAN (WLAN), a Personal Area Network (PAN), a Wireless PAN (WPAN), devices and/or networks operating in accordance with existing IEEE 802.11 (IEEE 802.11-1999: Wireless LAN Medium Access Control (MAC) and Physical Layer (PHY) Specifications), 802.11a, 802.11b, 802.11g, 802.11h, 802.11j, 802.11n, 802.16, 802.16d, 802.16e, 802.16f, standards ("the IEEE 802 standards") and/or future versions and/or derivatives thereof, devices and/or networks operating in accordance with existing Wireless-Gigabit-Alliance (WGA) and/or WirelessHDTM specifications and/or future versions and/or derivatives thereof, units and/or devices which are part of the above networks, one way and/or two-way radio communication systems, cellular radio-telephone communication systems, a cellular telephone, a wireless telephone, a Personal Communication Systems (PCS) device, a PDA device which incorporates a wireless communication device, a mobile or portable Global Positioning System (GPS) device, a device which incorporates a GPS receiver or transceiver or chip, a device which incorporates an RFID element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device (e.g., BlackBerry, Palm Treo), a Wireless Application Protocol (WAP) device, or the like.

Some embodiments may be used in conjunction with one or more types of wireless communication signals and/or systems, for example, Radio Frequency (RF), Infra Red (IR), Frequency-Division Multiplexing (FDM), Orthogonal FDM (OFDM), Time-Division Multiplexing (TDM), Time-Division Multiple Access (TDMA), Extended TDMA (E-TDMA), General Packet Radio Service (GPRS), extended GPRS, Code-Division Multiple Access (CDMA), Wideband CDMA (WCDMA), CDMA 2000, single-carrier CDMA, multi-carrier CDMA, Multi-Carrier Modulation (MDM), Discrete Multi-Tone (DMT), Bluetooth®, Global Positioning System (GPS), Wi-Fi, Wi-Max, ZigBee™, Ultra-Wideband (UWB), Global System for Mobile communication (GSM), 2G, 2.5G, 3G, 3.5G, Enhanced Data rates for GSM Evolution (EDGE), or the like. Other embodiments may be used in various other devices, systems and/or networks.

Without limiting the system and methods of the present invention to the following described processes and apparatus, in some embodiments systems and/or methods may include:

Parallel updates to the distributed database that according to an embodiment of the invention are performed by database servers. For example, a database server may update directly its associated database through an access to the internet. The database server, having preferably an access to the internet, may access data on the Internet according to known addresses to update its own database, and/or may search for new addresses to import new data to its database. In an embodiment of the invention local or remote updating servers may for example be used in addition or instead of database servers for supporting the search in and update of the distributed database. The updating may use for example local area networks and the Internet in order to exchange data with database servers for said cleaning post process. These systems and methods may enable to construct an image of data items and/or indexed data items associated with Internet addresses on said database servers.

A communication medium, according to an embodiment of the invention, may be a Local Area Network for data communication among the servers when servers are located in a common site, or any other suitable network or system.

Databases of database servers that according to an embodiment of the invention having each its own physical storage medium dedicated to the database server, are constructing the storage medium for a distributed image of said gathered data items and/or indexed data items from the Internet. Different, or at least substantially different, Internet data items and associated Internet addresses may be stored on different database servers, that may preferably enable low or no overlap among data sorted on different database servers.

Data structure of databases of database servers includes according to an embodiment of the invention Internet data items stored in association with one or more Internet addresses. For example, a web page, or a document, or media item or any other data item is stored with its associated address on the Internet as interrelated records. Interrelated records may also be associated as additional records either with relation to the Internet address or with relation to the data item, for example, additional addresses that are sighting or are sighted by the address of a stored data item.

It is expected that the larger the number of the database servers the faster can be the retrieval of search results from the said image of Internet data and/or indexed data distributed among the database servers. To a certain extent this may hold for a parallel computation search in a distributed database according to a single query. In this respect it is expected that different databases associated with different database servers may have less dependence on categorized data items stored in their databases.

Some embodiments include systems and/or methods to search for data items distributed among a plurality of servers according to search criteria. A server can be, for example, a stand alone server in a cluster of servers or a module that implements a server function in parallel computation of a mainframe, and the like. A data item may relate for example to text and/or a picture record, and/or a video record, and/or a vocal record, and/or to music records, and/or text that is informative on any other type of data, and the like. Said search for data items is according to a match between data content of data items and one or more search criteria. Search results of a said search will preferably include addresses to data items, with preferably additional data that are indicative of the content of data items ranked in a list as search results according to priorities, and/or any other data and/or information relating to, identifying, and/or defining the search results. Priorities are preferably determined by the levels of a match between data content of data items and search criteria.

In an embodiment, said addresses to data items may include an address of a data item in a said distributed database and preferably an address such as Internet address that may provide access to the original data item that according to an embodiment of the invention a copy of it is stored in a said distributed database.

According to an embodiment, data items may, for example, refer to documents, web pages, partial content of such items and any other Internet accessible data items.

In an embodiment, search results may include additional and/or alternative data such as addresses related to the said addresses, for example, addresses that are sighted in the data item associated with said addresses and preferably some additional data that are indicative of the content of the data item.

In an embodiment, said servers are equipped with a search capability to extract, according to search criteria, search results for data items from a database associated locally with each server (hereinafter referred to as "database server" that is used as a model to facilitate the description of a distributed search system as mentioned above). Search criteria are transmitted to database servers according to a query, for example, by a search control server. Under the control of, for example, a search control server, database servers that found data items according to search criteria transmit search results to a common server, wherein transmission of search results from a database server are preferably prioritized according to a level of a match between the content of data items and one or more search criteria of the query.

Without limiting search criteria to the following examples, search criteria may elaborate matching rules according to keywords and/or other possible data of a query, and possibly further matching rules determined by a search process, and the like.

A level of a match may be determined for example according to the number of matches of keywords with content of a data item and possibly further according to distance and/or semantic relations found between keywords and/or according to the time of update made to a data item, and/or according to any other suitable criteria and/or definition.

Prioritized transmission of search results to a common server, under the control of a search control server (which can be the common server as well), enable database servers having higher priority data items to transmit to a common server search results at a time before search results are transmitted by database servers having lower priority data items.

As further described in more detail prioritized transmission of search results from database servers to a common server may, according to the system and methods described herein, enable overcoming delays in communication that may be expected from a high number of database servers attempting to update a common server with search results according to priorities.

The following non-limiting definitions and/or examples of terms may be used by some demonstrative embodiments, and are not intended to limit the terms in any manner.

Search criteria may refer to one or more criteria of a query, preferably transmitted by a search control server to database servers, and the like. Database search results will refer to one or more said search results found by a database server for data items according to search criteria, and the like. Search results transmitted by a database server to a common server, according to a priority level of the search results, may be referred to in the following as a priority update of a database server. One or more priority updates received by said common server from one or more database servers according to a priority level may also be referred to in the following as a common priority update.

Search results of a common priority update are preferably sorted by the common server according to matching levels between search criteria and the content of data in data items for which search results are provided. Common priority updates sorted by a common sever may be referred to in the following as a sorted common priority update. Sorted search result of all priority updates of database servers may be referred to in the following as a final sorted list of search results. In this respect data items found according to search criteria by a database server refer to local data items and respective search results for such local data items may be referred to in the following as local search results. Sorted local search results may be referred to in the following as a local list of sorted search results. Search results for data items that may have the same priority level according to the level of a match between the content of data items and search criteria may be ranked arbitrarily in a sorted list of search results according to search results having respectively indistinguishable level of priority In an embodiment, a search control server controls the transmission of priority updates of database servers found according to a match between data items and search criteria of a query.

Different priorities in transmission time that refer to priority levels are given to said database servers preferably by a search control server according to one or more priority mapping phases that had mapped valid priority levels as further described.

In an embodiment, a search control server may be comprised of one or more servers possibly sharing more than one task of controlling the transmission of data items from database servers according to priorities. In an embodiment, the tasks and respective processes of a said search control server may include one or more of the following stages:

1) receiving a query,
2) transmitting query related search criteria to database servers, preferably as a broadcast message,
3) mapping valid priority levels for said priority updates of database servers, including the following possible sub-stages:
   A. allocating communication slots for signals to be transmitted by transmitters associated with database servers according to priority levels of search results and transmitting a respective message to database servers that elaborates on priority levels assigned to the communication slots,
   B. detecting signals transmitted by database servers in communication slots, and mapping accordingly valid priority levels for search results found by database servers,
   C. subject to a need to increase the discrimination among valid priority levels, for example, when the number of database servers that are found to be associated with a valid priority level mapped in stage (B) is higher than the number that may enable desirable throughput of priority updates of database servers, in a further stage, then, repeating stages (A) and (B) to increase the priority resolution for such valid priority levels mapped by prior stages (A) and (B),
4) transmitting, or preferably broadcasting, to database servers a message that elaborates priority in transmission of priority updates by database servers to a common server according to valid priority levels mapped in stage (3). Said priority levels may be elaborated according to the criteria that priority levels were determined by database servers according to stage (A) or according to identification of communication slots in which signals were detected in one or more stages of (B) and for which database servers may store a reference related to communication slots in which they have transmitted signals,
5) receiving priority updates of database servers and sorting according to priority levels search results to construct a common priority update,
6) transmitting to the source that initiated the query and/or to an intermediate computer that may further handle the sorted search results,
7) According to a predetermined procedure, repeating stages (5) to construct one or more common priority updates, and respectively repeating stage (6) in order to complement the construction of and the transmission of a final sorted list of search results. In an embodiment of the invention, priority updates further to the first common priority update may be handled to construct a single sorted list of search results to complement the first common priority update in order to provide a final sorted list of search results. According to this embodiment a repeated stage (5) will receive search results having lower priority than search results of said first common priority update, transmitted by each database server before repeating stage (5) and stage (6) as part of stage (7). According to an embodiment of the invention the transmission by each server in a repeated stage (5) may include all, or at least more than, the search results related to priority updates other than the first priority update.

In an embodiment, and according the above mentioned stages, the said search control server may serve also as said common server that receives said priority updates of database servers.

A database associated with a database server stores data items preferably different, or substantially different, from data items stored on other database servers.

A parallel search performed by a plurality of such servers, according to common search criteria, may relate to a search in a distributed database that extracts search results from a plurality of database servers according to a common query.

A plurality of servers may function as a single database server from the point of view of the system and methods described by the present invention, although internally it can be a cluster of servers implementing parallel computation for a search that may even implement parallel computation by each server including the model of the system and methods described by the present invention.

In this respect a said final sorted list of search results may be constructed of search results extracted by a plurality of said database servers each equipped with a search apparatus to extract local search results from a local database associated with the database server.

According to an embodiment, each database server is preferably equipped with sorting apparatus in order to construct a local sorted list of search results according to the level of a match between search criteria and the content of data in respective data items.

As further elaborated, according to an embodiment the tasks and respective processes of a database server may, for different implementation possibilities, include some or all of the following process stages according to a predetermined procedure:

a) receiving a message with search criteria,
b) according to search rules, extracting from a locally associated database search results having a match between the content of data items and the search criteria according to a search process,
c) determining priority levels to search results found in stage (b) according to the level of the match between the data content of corresponding data items and search criteria and, preferably sorting the search results accordingly,
d) receiving a message, according to a predetermined protocol, that elaborates priority levels assigned to communication slots allocated to signal transmission by transmitters of database servers according to priority levels of search results, and determining accordingly one or more priority levels for signal transmission by a database server according to the best match between priority levels of its search results, determined in stage (c), and corresponding priority levels assigned to the allocated communication slot,
e) transmitting by a transmitter associated with a database server a signal in the communication slot assigned to the highest priority level according to priority levels determined in stage (d) for the database server,
f) subject to a communication protocol that requires further transmission of a signal in one or more lower priority levels assigned with communication slots, transmitting in communication slots assigned to further priority levels a signal according to further priority levels determined in stage (d) for the database server,
g) subject to a further stage of (d) repeating stage (e) and possibly (f) to increase the discrimination among priority levels further to a prior discrimination made by prior stages (d) to (e) and possibly (f),
h) receiving a message that elaborates priority for transmitting search results by database servers according to valid priority levels that were detected by a common server according to transmission of signals in stage (e) and (f),
i) transmitting search results to a common server according to priorities elaborated in stage (h).

According to an embodiment, receiving in stage (a) is according to a predetermined protocol, and the message in stage (a) may include a query with one or more specific search criteria and possibly also search rules and/or possibly a pointer to implement stored search rules and/or possibly communication procedures for the subsequent stages and/or possibly information that affects the method of the search.

According to an embodiment, a message in stage (a) may include the message in stage (d). In such an embodiment timing to start step (d) may for example be determined in the message received in stage (a).

According to an embodiment, a message in stages (a) and (d) is a broadcast message transmitted to database servers in order to trigger a parallel search process through distributed computation.

In an embodiment, priority levels assigned to communication slots and the number of allocated slots may be determined and refined according to experience in order to minimize the need to repeat stage (d) and subsequent stages (e) and (f) for different types of queries. According to such an embodiment the timing to start stage (d) can also be determined and refined according to experience in relation to different types of queries.

According to an embodiment, the message associated with triggering steps (a) and (d) may include pointers to stored parameters associated with subsequent database processes that may be determined according to said refinements.

According to an embodiment, said refinements may be determined by a training process for different types of queries preferably using a converging method. A converging method may use for example a progressive resolution reduction starting at first with high discrimination resolution among priorities assigned to communication slots, and gradually reducing the resolution in further trials, and/or any other suitable method. It is expected that gradual reduction in resolution during a sequence of trials will reach a point where an optimized number of communication slots and respective assignment of priority levels associated with the communication slots may be determined in a way that maximum number of search results transmissions from a plurality of search processes will exploit the potential of given communication resources.

According to an embodiment, receiving in stages (a), (d) and (h) refers to receiving messages transmitted, or preferably broadcasted, from a search control server to database servers.

According to an embodiment, the search process in stage (b) may relate to any method that may satisfy the information retrieval that may possibly controlled by the message received in stage (a).

According to an embodiment, the allocation of communication slots to the transmission of database servers in stage (e) and (f) is an allocation performed by a search control server. According to an embodiment, transmitting in stages (e) (f) (i) refer to database servers that are transmitting to a common server, preferably a search control server.

In some embodiments, according to stage (i), search results by different database servers are transmitted as a priority update or as a sorted priority update by the database servers to a common server according to different priorities in time given to search results of database servers in stage (h).

Transmission priority levels assigned according to valid priority levels of search results to database servers in stage (h) are different from priorities in a sorted list of search results. In a sorted list relative priorities are given a posteriori to search results according to the level of match with search criteria, whereas transmission priority levels given to database servers are determined a priori to assign priority levels to communication slots in which valid priority levels can be detected. In this respect search results in different database servers that have the same priority level in stage (i) may have data items with unknown relative priority interrelation and therefore search results of a plurality of a priority updates, even though they may have the same priority according to stage (h), have to be sorted by a common server. Both a valid priority level and a relative priority given to search results in a sorted list of search results are determined according to a level of match between the data content of corresponding data items and search criteria, while a relative priority may provide the highest discrimination priority resolution in comparison to a given priority level that may not guarantee the highest discrimination priority resolution. 1.

A priority level given to database servers according to the priority level of search results can be expected to have lower discrimination resolution than a relative priority in a sorted list of search results. In this respect, an exhaustive discrimination among valid priority levels might not to be reached through one or a few phases of stages (d) to (f) according to stage (g) and accordingly a priority level given to transmit search results by a database server in stage (h) can be expected to be associated with a plurality of search results having different relative priority levels.

In an exhaustive discrimination, wherein a single search result becomes associated with a valid priority level, discrimination phases might take time that is subject to uncertainty, and could be justified if first and second moments of statistics are known and can justify the time. Although an exhaustive discrimination may enable to avoid the need for a multiple access method to be used in stage (i), it might be more costly in time than a multiple access phase of data transmission.

The methods for transmitting search results in stage (i) may use any suitable methods known in the art for data transmission. Mentioned methods mainly relate to families of data communication with the aim to highlight the benefit of using stages performed by a database server up to stage (h) in order to improve the throughput and the prioritized transmission in stage (i). Therefore stage (h) may preferably include multiple access control parameters to improve the throughput of a method used in stage (i).

According to an embodiment, when an exhaustive discrimination is reached for one or more valid priority levels and accordingly a multiple access control phase of data transmission can be saved for such a valid priority level, a flexible time multiplex is used in stage (i) in order to reduce the link access overhead, for example, by letting the database server to transmit all, or sufficiently enough, search results associated with the priority level. Flexible time multiplex can be based on carrier sense, for example, by using CSMA related method according to priority. In this respect, CSMA functions as a contention based multiple random access method only when according to a valid priority there are more than one database servers having search results assigned to the same valid priority. In case that an exhaustive discrimination is reached then the database server having search results associated with a priority level lower than a higher valid priority level according to stage (h) may access the communication medium in stage (i) without contention, that is, when it senses that a prior transmission having one level higher valid priority came to an end.

In an embodiment, when the level of the said uncertainty in time required to reach an exhaustive discrimination is unknown, or known to be lengthy, to enable to reduce the benefit of saving the multiple access control phase for data transmission, for example, by being a cause to a more lengthy process at a non acceptable percentage of cases, then a non exhaustive discrimination is used to discriminate valid priority levels and a contention based random multiple access control phase for data transmission is added to stage (i) for the transmission of search results according to priority levels given in stage (h). A contention based random multiple access control phase for data transmission may be based on carrier sense or energy sense as known in the art, used with different communication networks, and may serve both valid priority levels that reached an exhaustive discrimination and accordingly may require no multiple access control and also valid priority levels that need the multiple access control for data transmission.

With multiple access methods, optimized throughput of transmission of search results is achieved when the phase of medium access control overheads to access a communication medium, according to the multiple access method, is minimized.

Since the number of database servers associated with a valid priority level is expected to be adjusted to one or at most to a few database servers, before stage (h) is activated, contention based random multiple access methods are the preferred methods to be used with stage (i).

Different contention based random multiple access methods may have different random delay parameters to optimize throughput according to traffic load and may have different performance accordingly.

For example, with a small traffic load a 1-persistent CSMA method may have higher throughput than a non persistent CSMA and vice versa. In an embodiment of the invention control parameters to control the preferred method are added to stage (h) to determine the transmission method in stage (i), for example, persistent CSMA or non persistent CSMA will be used according to the expected number of transmitters that are assigned to a valid priority level.

Another aspect that affects the throughput is the proportion between the multiple access control overhead and the data transmission length.

In an embodiment, in order to increase the data transmission throughput of multiple access methods in stage (i), search results having lower priority levels than highest priority search results, according to the message in (h), will be transmitted by a database server with its search results having the highest priority level according to the priority time given to said highest priority level search results in stage (h).

In accordance with an embodiment, all search results found by a database server in stage (b) are transmitted with the highest priority search results associated with transmission time by the database server in stage (h). According to this embodiment stage (f) can be omitted. In another embodiment stage (f) is not omitted, although search results having lower priority level are also transmitted with higher priority search results. The benefit of using stage (f) in such a case is when a limiting criterion associated with this embodiment limits the transmission length of data at the time assigned for a database server to transmit according to its highest priority level search results. Such a criterion may help to shorten the delay in response time to the highest priority search results and lower priority search results that were not transmitted with higher priority search results will be scheduled according to stage (f) to a respective valid priority level for stage (i). The said limiting criterion can be elaborated for example in stage (h) by a limit on the number of transmitted search results for a valid priority level. According to this embodiment stage (f) may enable to schedule, in stage (h), the transmission of search results, which according to the said criterion were not transmitted at the time given to a higher priority level of search results, at a time given to lower priority search results.

In an embodiment, the number of priority mapping phases to be used to discriminate valid priority levels, comprised of stages (d) to (g), are subject to the contribution to the throughput of search results transmitted in stage (i).

In an embodiment, the contribution can be based on prior statistics that may limit the number of priority mapping phases and repeating accordingly stages (d) to (e) and possibly (f) according to stage (g). In this respect a single priority mapping phase is comprised of stages (d) (e) and possibly (f).

Stages (d) to (g) may enable a common server such as a search control server to map valid priority levels in correspondence with database servers that found search results in stage (b) and its search results were associated with priority levels in stage (c).

In order to reach higher level of the discrimination for valid priority levels, a single priority mapping phase might not be effective enough to reach high discrimination, and a plurality of mapping phases may help to reduce unused communication slots assigned to priority levels that might not be valid. In a priority mapping phase which is a subsequent phase to a prior priority mapping phase, stage (d) according to stage (g) may transmit, or preferably broadcast a message to initiate the subsequent priority mapping phase in which the message to database servers refer to new assigned priority levels to communication slots. The new assigned priority levels may use a reference to prior valid priority levels detected in a prior mapping phase in order to save time to determine high resolution of priority levels. For example, a plurality of priority levels assigned to communication slots in a subsequent stage (d) according to stage (g) will be sub-priority levels of a valid priority level detected in a prior priority mapping phase of a preliminary priority mapping process.

In an embodiment, a valid priority level that was detected in a prior mapping phase and used as a reference to higher discrimination of priority levels assigned to communication slots in a subsequent mapping phase, may save data for specifying the relation among priority levels and communication slots in stage (d) according to stage (g).

In an embodiment, a priority level in a subsequent phase to a prior mapping phase may refer to joint levels of valid priorities. Joint priority levels may for example be comprised of adjacent priority levels assigned to different communication slots. A valid priority level of a priority mapping phase may relate, in one example, to more than one communication slot associated with a priority level.

Priority mapping phases performed in stages (d) to (g) will preferably be using transmission of signals in stages (e) and (f) that may enable non destructive signal detection of multiple signal transmission and preferably enable detection of constructive signal transmission by multiple servers.

According to an embodiment, detection of signals transmitted by one or more database servers in stages (e) and (f) is performed by a search control server.

In an embodiment, signals transmitted by a plurality of servers in stage (e) and (f) will preferably have a form that enable a detection process to assess the number of database servers that are transmitting in a communication slot, for example, according to the sum of received energy of signals transmitted by database servers in a communication slot.

Assessment of the number of database servers that are transmitting in a communication slot may further enable a search control server to discriminate valid priority levels through further stages (d) to (f), according to stage (g), in order to adjust the desirable number of database servers to be associated with a priority level and accordingly to improve the throughput of the transmission in stage (i) by stage (h).

A plurality of such signals transmitted by database servers in stages (e) and (f) are preferably constructive so that the sum of energies of such signals can be detected by a method that may assess the number of the database servers according to the energy level detected in a communication slot. A sum of energies received from multiple transmissions that are indicative on the number of the servers is preferably constructed by signals having the same energy level contribution to the detection.

In an embodiment, the number of the search results associated with database servers according to a priority level is preferably assessed in addition to the assessment of the number of database servers. A possible assessment of the number of search results may be performed through a separate physical communication medium or through a separate frequency channel or time in the communication medium in which a replica of allocated communication slots is allocated to database servers according to stage (d) and in which signals in stage (e) and (f) are also transmitted according to the method wherein substantially simultaneous transmitted signals in a communication slot may enable a detection of transmitted signals in relation to the number of search results associated with a priority level. A plurality of such signals transmitted by database servers are preferably constructive so that the sum of energies of such signals can be detected by a method that assesses the number of the search results according to the energy level received by the detector.

In an embodiment, a separate communication medium is used to assess the number of search results associated with a priority level, and accordingly a database server of such an embodiment is equipped with preferably two transmission apparatuses to be used in stages (e) and (f), one to assess the number of database servers and another to assess the number of search results associated with a priority level.

In an embodiment, valid priority levels detected through a priority mapping phase in stage (e) and (f), by a server that uses energy level detection to assess the number of database servers transmitting in a respective communication slot, may also determine a need for a subsequent priority mapping phase or phases. A need for a subsequent priority mapping phase is judged with the aim to adjust the number of database servers to be associated with a single priority level in order to improve throughput for transmission of search results in stage (i) as long as the cost in time to perform priority mapping is justified by an overall improvement in response time to search results according to a query. One main parameter to enable to judge the justification for further using higher level of discrimination of priority levels through further phases of priority mapping is the assessed number of database servers associated with a valid priority level. The higher the number of database servers the higher is the justification to perform further priority mapping phases.

In an embodiment, priority levels determined by a plurality of priority mapping phases may associate database servers with valid priority levels in stage (h) by providing a message with a prioritized sequence of valid priority levels, detected during stages (d) to (g). Accordingly database servers will transmit respective search results in stage (i). In an embodiment of the invention priority levels assigned to communication slots in stage (d), which have known relation stored by database servers, may be used in stage (h) to assign valid priority levels indirectly according to communication slot numbers in which signals were detected.

In an embodiment, priority levels assigned to database servers in stage (h) are expected to discriminate search results of database servers according to priority levels at a level that may enable a multiple access communication method to be a preferred method for transmitting search results in stage (i).

In an embodiment, wherein detection of signals in a communication slot, as a result of stages (e) and (f), is indicative on the number of the database servers associated with a valid priority level, delay parameters can be assigned in stage (h) to a multiple access method data transmission in order to improve the throughput in stage (i). In this respect the higher the number of database servers that are expected to use common communication resources in stage (i), according to a common priority level, the higher is the interval of time from which a transmitter chooses a random delay to access the medium in order to improve the throughput.

According to some embodiments, communication slots used by database servers in stages (e) and (f) are preferably minimized with respect to the use of communication resources. Time slots are preferably minimized in order to enable energy detection of a signal in the shortest time, and if frequency slots are used then they are preferably minimized to the narrowest bandwidth for energy signal detection.

By using energy detection per communication slot, and signals with said characteristics, stages (e) and (f) may minimize loss of communication resources due to non valid priority levels, while the non destructive energy detection of multiple transmission of signals in a single communication slot assigned to a priority level in stage (d) may enable lossless transmission of signals transmitted by a plurality of database servers in stages (e) and (f).

Such an efficient use of communication resources provides a key to justify a preliminary priority mapping in order to enable prioritized transmission of data items to a common server.

In an embodiment, without limiting the criteria to discriminate among priority levels, a communication slot allocated and assigned to a priority level may discriminate priority levels from a higher priority and from a lower priority according to the number of keywords having a match with a content of a data item found by a database server according to a query and possibly according to the distance of matched words and/or possibly according to a semantic level of relation between matched words and possibly according to the time passed from last update and possibly according to other valuable search criteria.

In an embodiment, a database server transmits in more than a single communication slot at the same time, for example, when frequency slots are used with stage (e) and (f) for different data items that may relate to different priority levels in a database server. With such a method a database server transmits substantially at the same time in more than a single communication slot, for example, by using OFDM. According to this method, suppression of carriers can be used for non valid priority levels for which a database server has found no search results.

In an embodiment, the functionality of stage (e) may relate to a time slot in which data is transmitted in stage (e) as part of a merge between stage (i) and stage (e). For example a delay parameter in contention based multiple access methods such as CSMA/CD or CSMA/CA or CSMA/CARP, can be used according to discrete time intervals to discriminate between successive priority levels. In such an embodiment the resolution of the delay can be related to the said communication slots that are assigned according to said priority levels for energy detection and used by the database transmitters as a first delay criterion according to a priority level determined by a predetermined process in database servers. A further random delay criterion can be used in order to resolve contention for receiving search results, having the same valid priority level, from a plurality of database servers. In such an embodiment of the invention the database servers are listening to the transmission of other database servers that are equipped with carrier sense, or a detector to detect signal existence in different frequency communication slots, which may enable to omit stage (h). Stage (d) may be omitted if the respective process in a search control server to construct the message for stage (d) is implemented in each database server that listens and detects signals transmitted signals by database servers in communication slots according to priority levels.

According to a said detection, that enable to assess the number of the database servers according to the level of the received signal, a further mapping phase may be considered by the database servers while enabling higher resolution of priority mapping while enabling to omit stage (g).

Following is a description of an exemplary implementation of a search engine, in accordance with some demonstrative embodiments.

According to an embodiment, a search, for example, for Internet data, is performed by a system and methods that updates a stored image of Internet data items and/or indexed data items distributed among database servers, wherein possible embodiments of the above described system and method may be implemented with one or more of the following processes and apparatus that may include:

1. A search control server that receives a search query, for example, through the Internet, and transmits or otherwise broadcasts the query with respective keywords and possibly also other search related criteria to local and/or remote database servers in which the distributed Internet data items and/or indexed data items of said image is stored.
2. A database server equipped with a database search software tool and with access to a local database, preferably having also a capability to update the database with Internet data, searches for data items according to the query and possibly other search criteria associated with search rules implemented by a database server.

A result of a search process, preferably received by a search control server from a plurality of database servers, includes the highest priority of said sorted common priority updates and preferably a said final sorted list of search results.

A priority level may relate for example to the level of a match of data items with one or more criteria of a query and possibly with one or more other criteria such as for example the time passed from the last original update of a data item and other possible criteria. Preferably the higher the priority the higher is the match with the query criteria. For example, a slot assigned for the highest priority will be indicative on a search result with all the key words in a query having an update from the recent hour of the day of the search and in which the keywords have the minimum distance and/or highest semantic relation and appears more than a certain number of times.

A transmitted signal may relate to a DC pulse, a shaped pulse, or an AC pulse that may be possibly an RF pulse such as a tone in time and/or in time-frequency slot wherein a multi tone signal can be used to generate substantially simultaneous signals in more than one slot assigned for different levels of priority levels for which a database server found respective search results. Multi tone signals may be generated for example by OFDM methods that can use suppressed tones in frequency slots for which no search results were found by a database server.

A said local database associated with a database server is possibly a physical storage medium dedicated to the database server. A said local database includes data gathered from the Internet possibly by the database server itself through an access of the database server to the Internet.

A said search control server and said database servers are preferably equipped with an access to a common wire or wireless communication medium that enables usage of wide band spectrum to be divided into time and/or time-frequency slots for signal transmission in said communication slots.

Interference, caused by substantially simultaneous signals transmission in a common communication slot, can be minimized by a synchronized transmission of the same signal transmitted by different transmitters, enabling a detection of a constructive sum of energies. The signal is preferably a non data modulated signal in order to save detection time of data and to minimize the bandwidth of noise floor in relation to the bandwidth of the signal. A limited linear dynamic range of a receiver that has to detect simultaneous transmission in frequency divided communication slots may use more lengthy signals to enable energy detection by a correlation related method that increases the signal to noise ratio with transmission time. This may enable to lower the transmission power of each transmitter for a cost of time of detection. Synchronized signals transmitted from database servers or under the control of a database server may enable detection of energy in communication slots according to the level of the sum of the energy of transmitted signals. Power control methods can also be used to equalize the level of signals received from different transmitters having different power loss in relation to distance or other attenuation causes that may affect detection by a common signal detector. This may enable to create better relation between the detected sum of received signals and the number of transmitters.

Adjacent channel interference, when frequency slots are used instead or in addition to time slots, can be minimized by for example generating orthogonal shaped signals as used with OFDM or other shaped signals that may reduce adjacent channel interference. OFDM may further enable multiple signal transmission in multiple frequency slots at the same time according to the priority of different search results.

Gathered data from an Internet address is preferably stored with its associated internet address in a local database associated with a said database server, for example, a web page associated with an address or any data content other than web pages associated with an address are stored with their respective address as interrelated data items.

Internet data associated with its Internet address may further relate to data and address stored as a data item in the database associated with the database server preferably with further associated data that may include addresses that are parents of the associated address and/or addresses that are sighting other related addresses.

Parallel computation of database servers, preferably having each an access to the Internet, may access data on the Internet according to Internet addresses to update their own database, for example, according to addresses dedicated to database servers and/or according to a search for new addresses to import new data to the database according to categorized fields and/or possibly according to other criteria. At a time that a database server is not participating in a search according to a query, it may preferably update its database by Internet data. Preferably different addresses on the Internet are maintained by different database servers. This may enable to construct and update an image of Internet data and/or indexed data associated with Internet addresses on said database servers.

Alternatively or in addition, one or more dedicated servers, possibly including the search control server, may be used to update the Internet data for database servers to which database servers have access and may gather the update results and/or by enabling the updating server to update the database servers with the gathered updates.

A communication medium could be a wire or wireless medium such as a Local Area Network that enables communication between a search control server and database servers that may be located in a common site.

A control message transmitted by a search control server may include one or more queries, and/or allocation of communication slots and/or messages to manage interleaved searches. Interleaved searches may relate to parallel searches performed by the same system platform for different queries. For example, it is expected that waiting times due to sequential processes in the control server and database servers will not enable to effectively use communication and computation resources continuously. This is a result of a need to handle successive stages of a process which may require signals and data exchange between a common server and database servers, according to intermediate results, and which create during a single search process idle time in usage of common communication and computation resources. In order to minimize said idle times in communication and computation resources and as a result to improve response time to a query, parallel processing for a plurality of queries is preferably used. Such parallel processing is based on a pipeline related concept. For example, when a subsequent query that is being broadcast to database servers before prior query related search results are retrieved, may enable database servers which are at idle time to perform processes in relation to a subsequent query and as a result to utilize idle times in communication and computation resources.

The following description relates to demonstrative implementations of methods and/or systems, in accordance with some demonstrative embodiments.

FIG. 1 shows basic data flow between a search control server and database servers and the signaling flow from database servers to a search control server, in accordance with some embodiments.

Figure 1A:
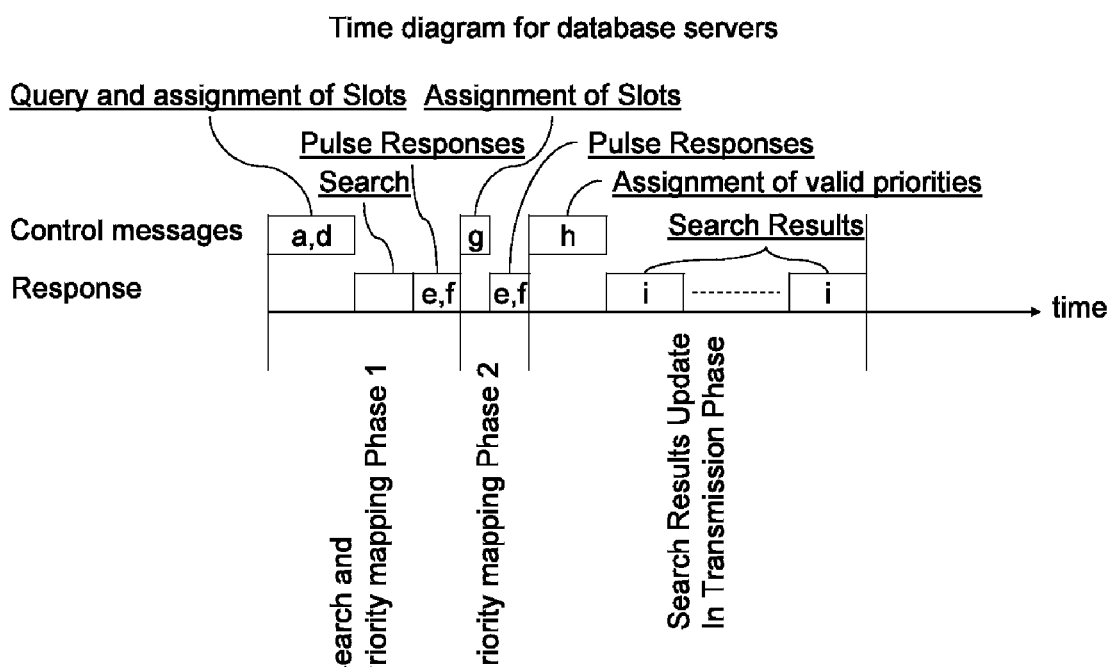
FIG. 1A shows a respective timing model of stages a, d, e, f, g, h, and i associated with the data and signal flow, in accordance with some embodiments.

FIG. 1A shows a respective timing model of stages a, d, e, f, g, h, and i associated with the data and signal flow using notations of stages, e.g., as described in detail above, in accordance with some embodiments.

Figure 1B:
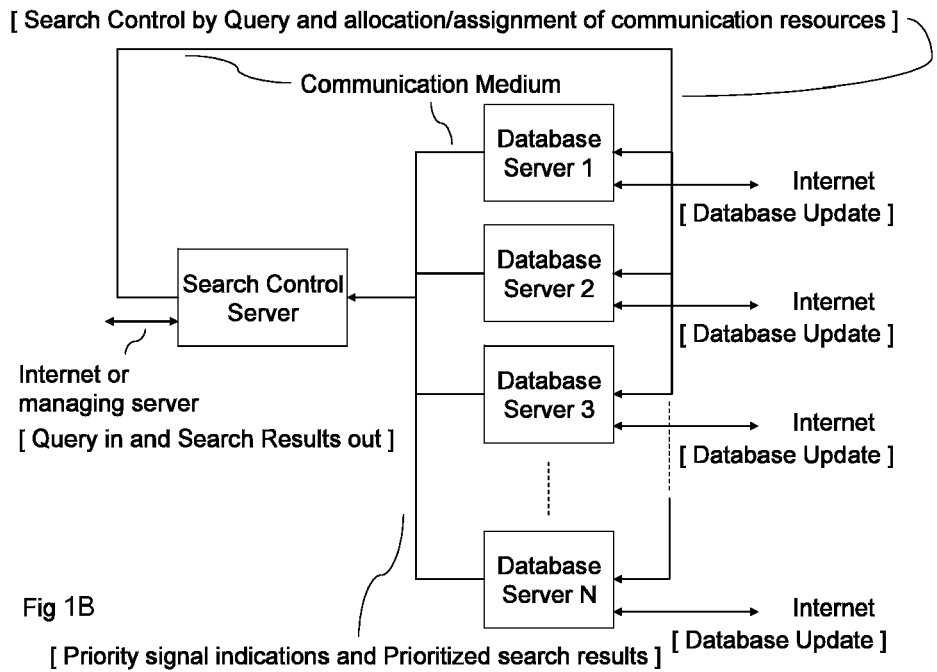
FIG. 1B and FIG. 1C show implementation models wherein FIG. 1C separates the data and the signaling transmitted from database servers to a search control server, in accordance with some embodiments.

FIG. 1B shows implementation models for the preliminary priority mapping process, in accordance with some embodiments, e.g., as described above.

Figure 1C:
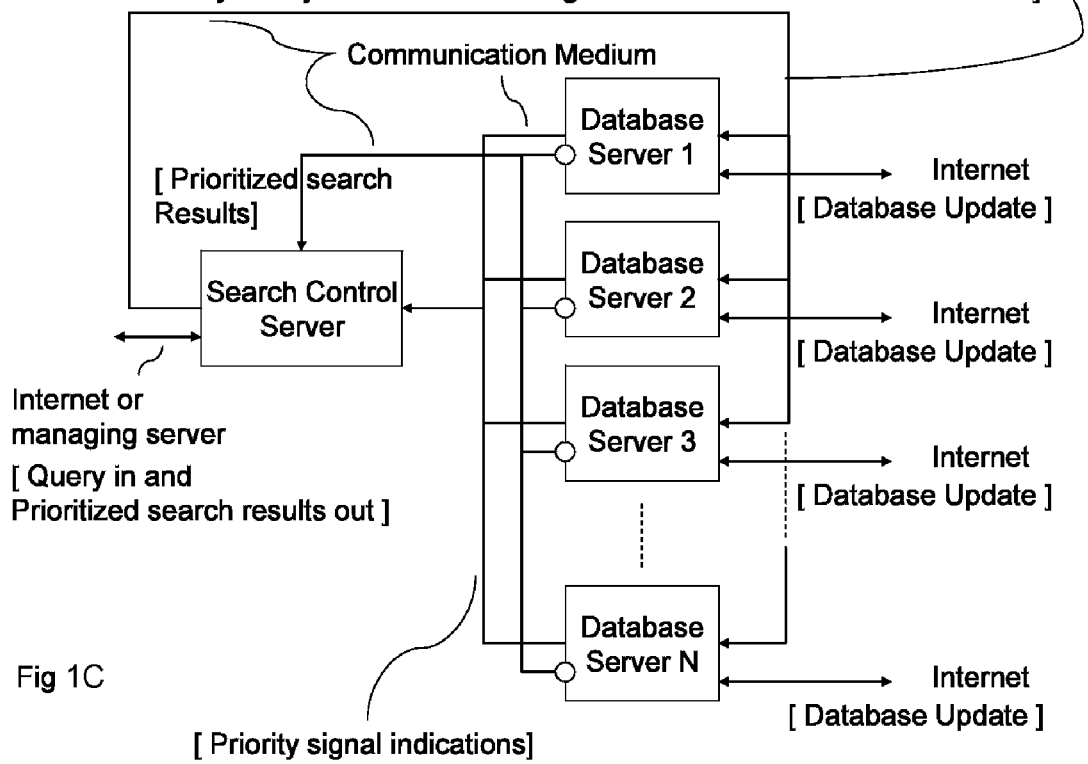

FIG. 1C shows implementation models, implementing separate communication medium for data and for the signaling transmitted from database servers to a search control server, in accordance with some embodiments.

Figure 1D:
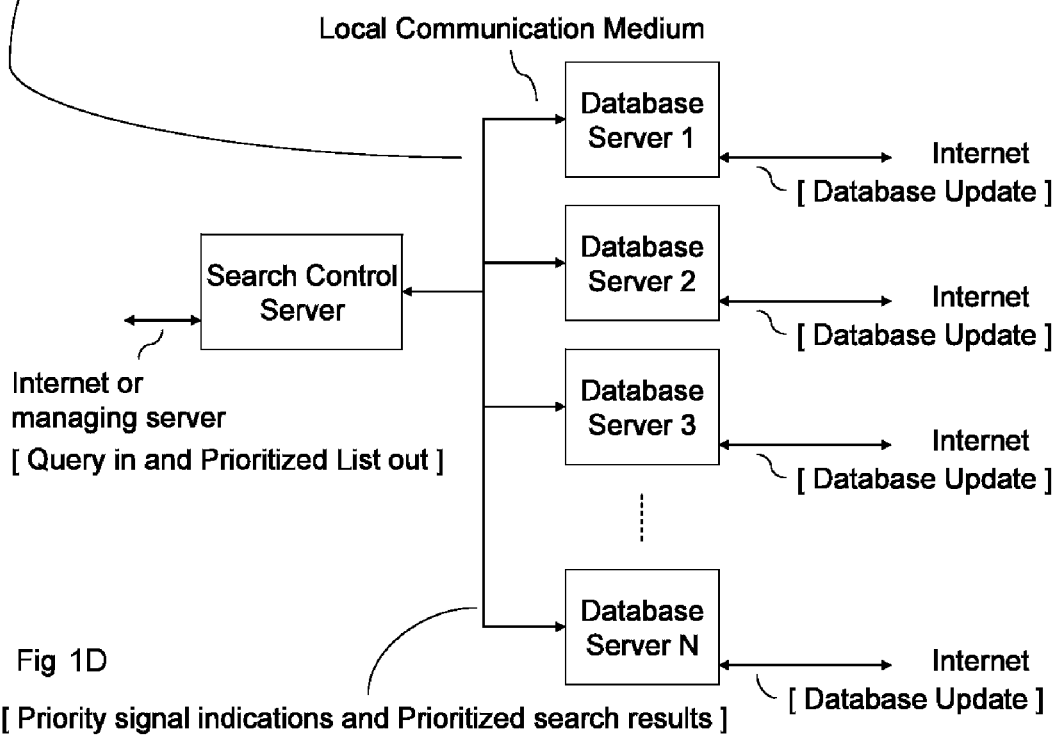
FIG. 1D suggests a unified network between a search control server and database servers, in accordance with some embodiments.

FIG. 1D suggests a unified network for data and for signaling between a search control server and database servers, in accordance with some embodiments.

Figure 2:
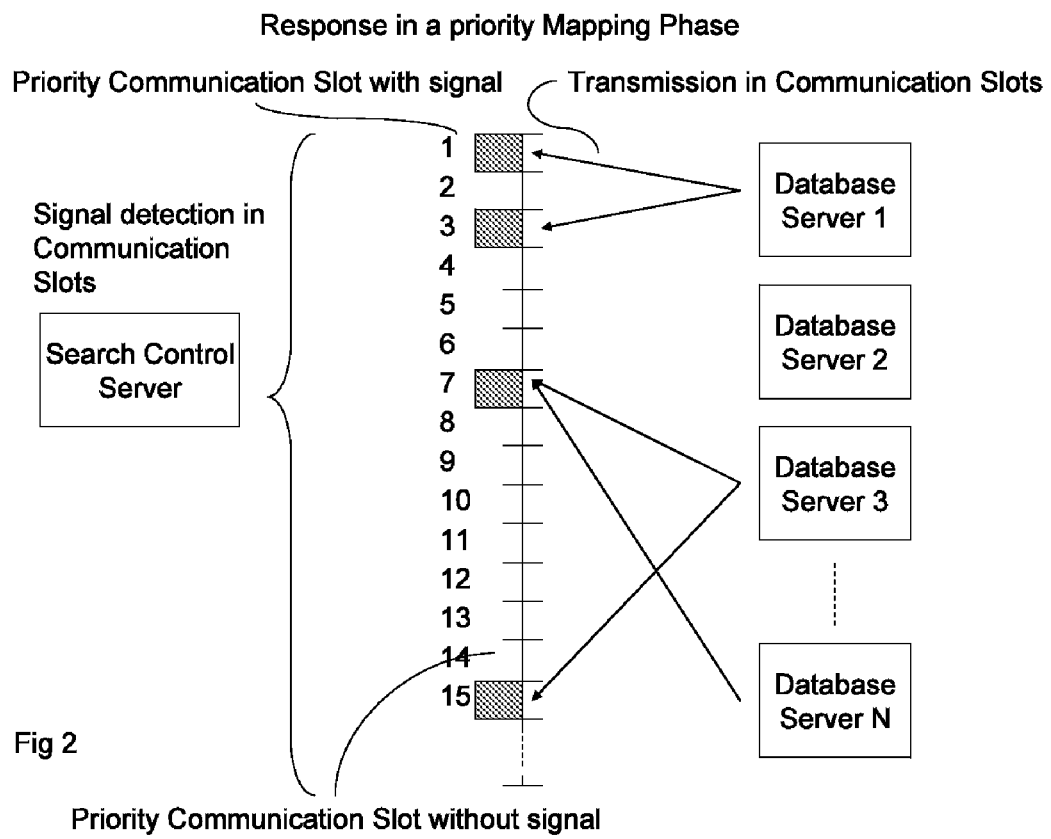
FIG. 2 shows communication slots used by database servers for signal transmission wherein the level of detected signals in slots 1,3,7,15 has no meaning (only the existence of one or more signals in a slot has a meaning of valid priority), in accordance with some embodiments.
Figure 2A:
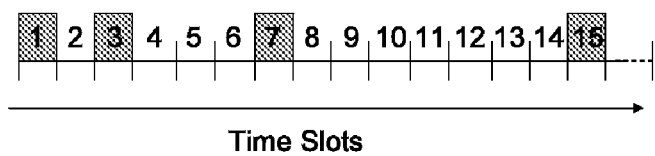
FIG. 2A shows implementation in time slots and in time-frequency slots, in accordance with some embodiments.
Figure 2A:
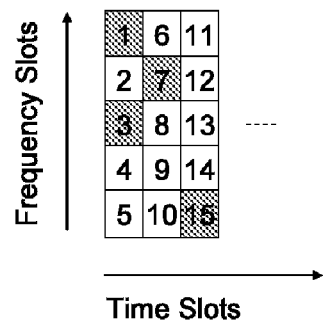

FIG. 2 shows communication slots usage by database servers for signal transmission in time slots or in frequency slots or in time and frequency slots, e.g., as shown in FIG. 2A, wherein the level of detected signals in slots 1,3,7,15 has no meaning (only the appearance of one or more signals transmitted by database servers in a communication slot has a meaning of valid priority discrimination level), in accordance with some embodiments.

FIG. 2A shows implementation in time slots and in time-frequency slots of the example provided in FIG. 2, in accordance with some embodiments.

Figure 2B:
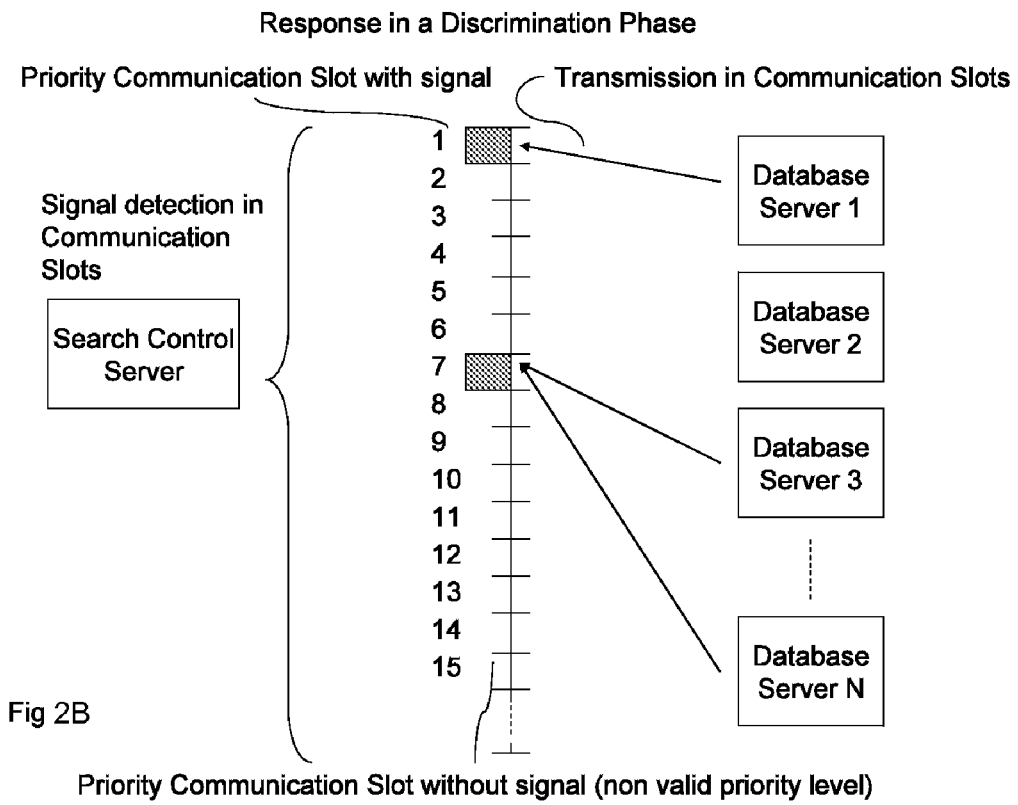
FIG. 2B shows the option to map valid priority levels as in FIG. 2 with the limit of mapping only the highest priority levels in case that stage (f) is omitted, in accordance with some embodiments.

FIG. 2B shows the option to map valid priority levels as in FIG. 2 with the limit of mapping only the highest priority levels in case that stage (f) is omitted, in accordance with some embodiments.

Figure 2C:
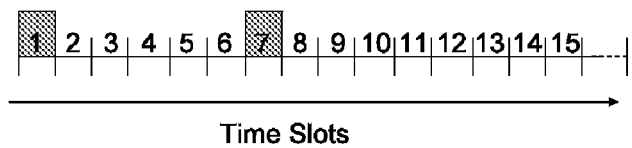
FIG. 2C shows the implementation of FIG. 2B in time and in time-frequency slots, in accordance with some embodiments.

FIG. 2C shows the implementation of FIG. 2B in time and in time-frequency slots, in accordance with some embodiments.

Figure 3:
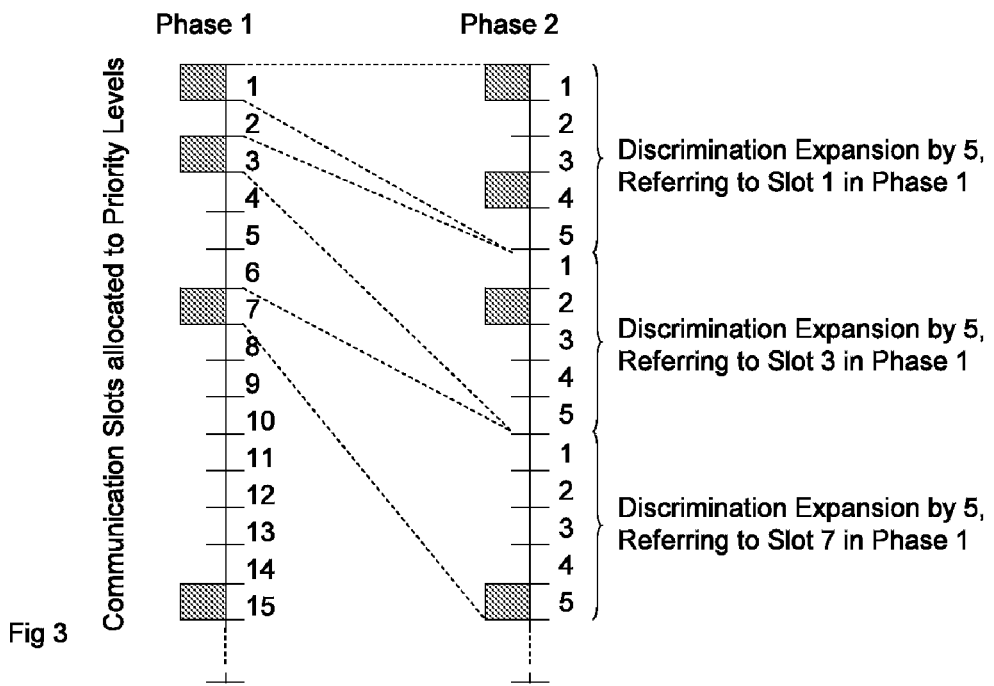
FIG. 3 shows two subsequent priority mapping phases, in which valid priority levels that are detected in communication slots 1,3 and 7 of phase 1 are further discriminated by phase 2, in accordance with some embodiments.

FIG. 3 shows usage of slots in two priority mapping phases, wherein the usage of slots in the first phase (on the left) is the model shown in FIG. 2, and wherein valid priority levels that are detected in communication slots 1,3 and 7 of phase 1 are further discriminated by phase 2, in accordance with some embodiments.

Figure 3A:
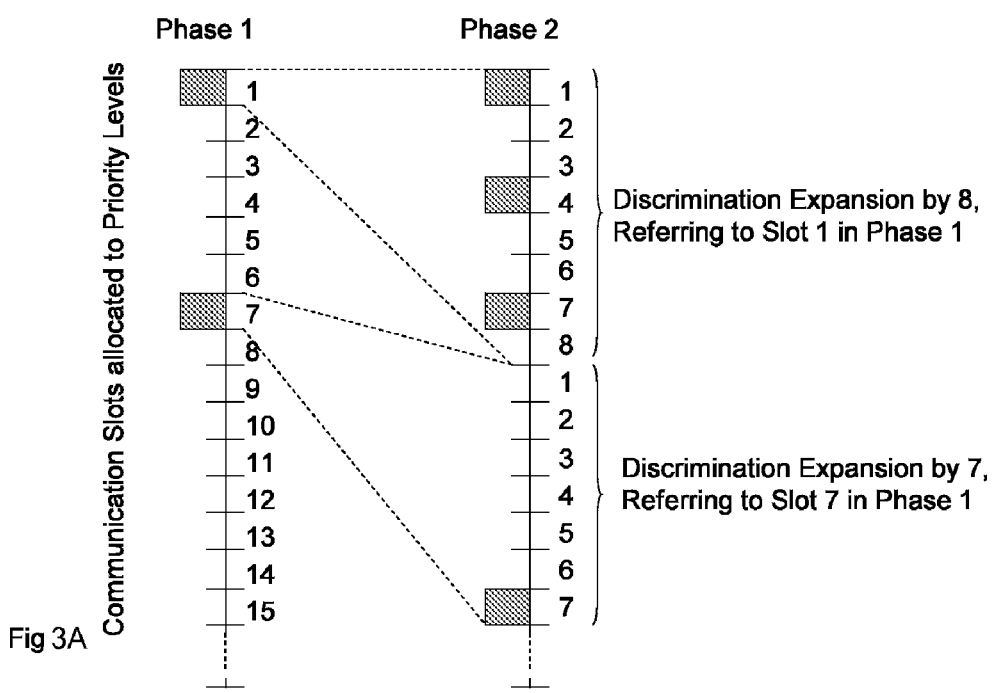
FIG. 3A shows two priority mapping phases in which the valid priority levels associated with communication slots in FIG. 2B are further discriminated in phase 2, in accordance with some embodiments.

FIG. 3A shows two priority mapping phases in which the valid priority levels associated with communication slots in FIG. 2B are further discriminated in phase 2, in accordance with some embodiments.

Figure 4:
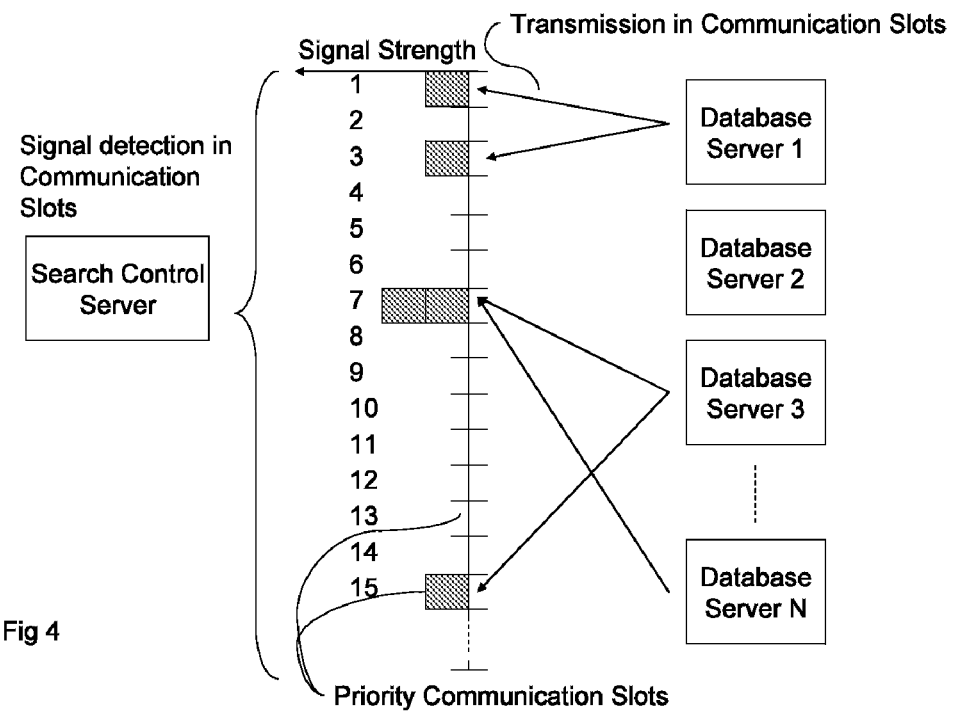
FIG. 4 shows priority discrimination as in FIG. 2 wherein the level of the signal detected in slots 1,3,7,15 is proportional to the number of the transmitters, in accordance with some embodiments.

FIG. 4 shows priority discrimination as in FIG. 2, wherein the level of the signal detected in slots 1,3,7,15 is proportional to the number of the transmitters, as shown by a higher strength of signal for slot 7, wherein the strength of the signal shown in FIG. 4 is highlighted in relation to the required design of a detector to be sensitive to the difference in signal strength, and the need to maintain constructive strength for signals transmitted in the same slot by a plurality of transmitters, and preferably use a reference signal detection for a unit to which sum of signals can be compared in order to identify the number of transmitters, in accordance with some embodiments. It is noted that the signal strength, e.g., in one or more of FIGS. 1-3A, may also construct similar difference in the strength of the signals but the system design may have no need to take it into consideration.

Figure 4A:
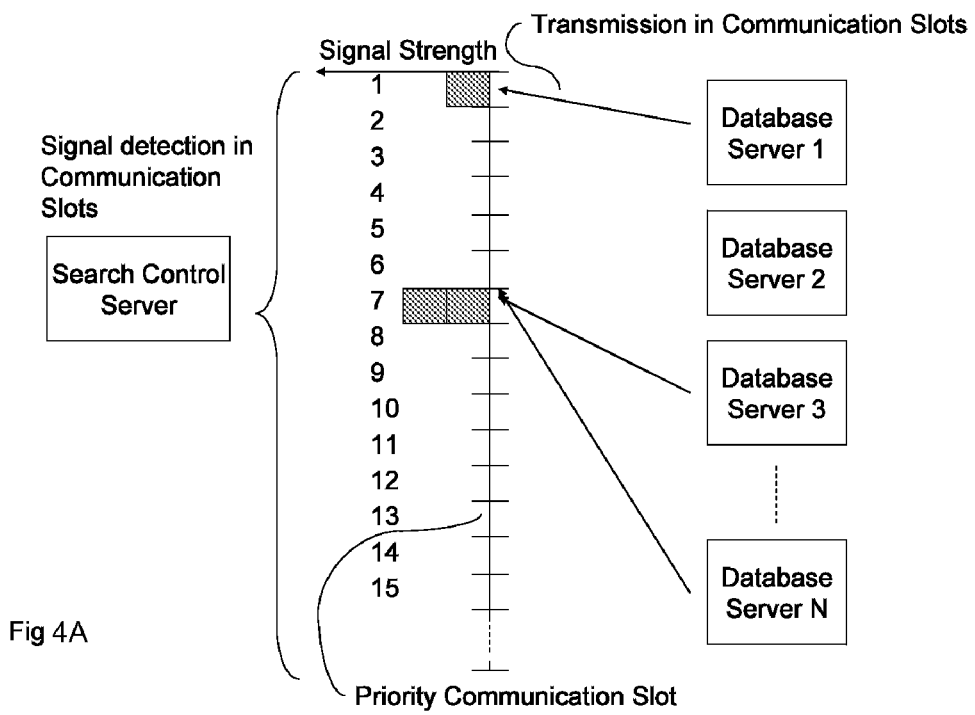
FIG. 4A shows valid priority levels of FIG. 2B wherein the level of the signals in respective communication slots is proportional to the number of the transmitters, in accordance with some embodiments.

FIG. 4A shows valid priority levels of FIG. 2B, wherein the level of the signals in respective communication slots is proportional to the number of the transmitters, in accordance with some embodiments.

Figure 5:
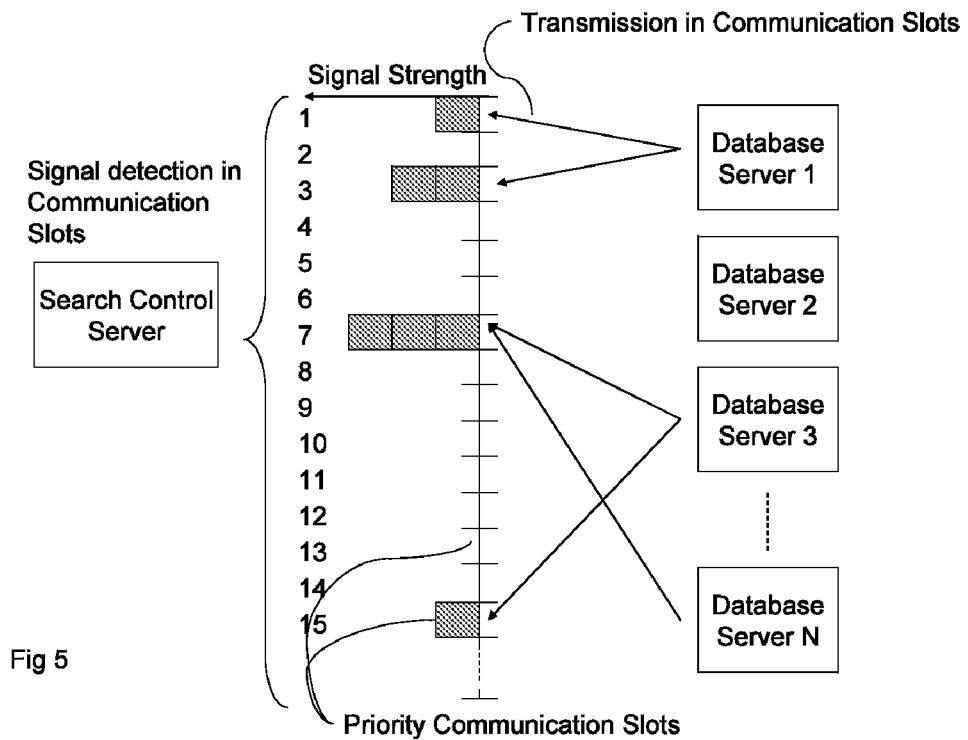
FIG. 5 shows the option to map the number of data items according to valid priority levels associated with communication slots allocated as a replica of FIG. 4, in accordance with some embodiments.

FIG. 5 shows the option to map, e.g., according to signal strength detection, the number of data items according to valid priority levels associated with communication slots, wherein the model of FIG. 4 is used as a base, and wherein accordingly the strength of the signal in slot 3 represents two data items for a valid priority level and 3 items in slot 7, in accordance with some embodiments.

Figure 5A:
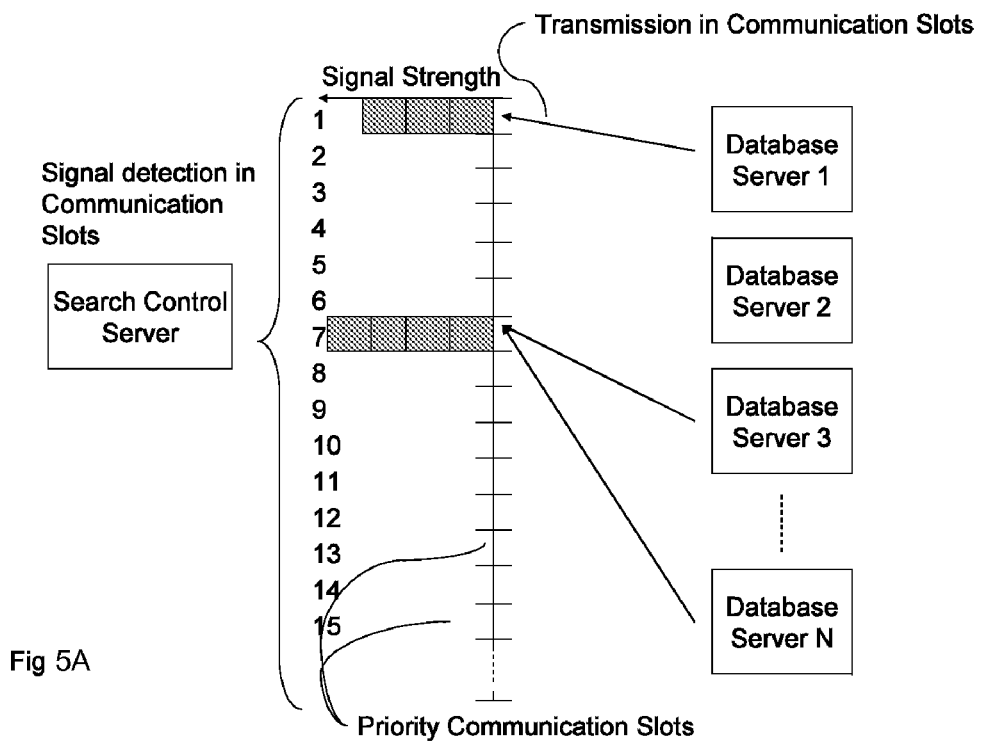
FIG. 5A shows valid priority levels of FIG. 2B assigned to communication slots in which the level of the signal is proportional to the number of data items, in accordance with some embodiments.

FIG. 5A shows valid priority levels of FIG. 2B assigned to communication slots in which the level of the signal is proportional to the number of data items, in accordance with some embodiments.

Figure 6:
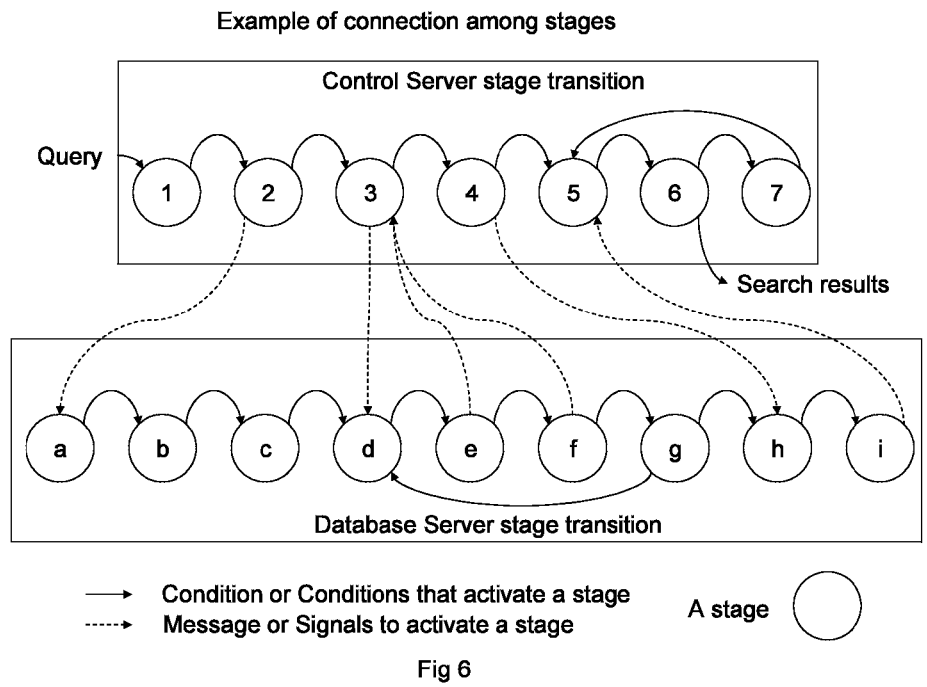
FIG. 6 shows an example of stage transitions in a database server in relation to stage transitions in a control server with respect to stages described above, in accordance with some embodiments.

FIG. 6 shows an example of stage transitions in a database server in relation to stage transitions in a control server using notations of stages as described above, in accordance with some embodiments.

Some embodiments may be implemented as an article of manufacture, which may include a machine-readable storage medium to store logic, which may be used, for example, to perform at least part of the functionality of the systems and/or methods described herein.

In some demonstrative embodiments, the article and/or machine-readable storage medium may include one or more types of computer-readable storage media capable of storing data, including volatile memory, non-volatile memory, removable or non-removable memory, erasable or non-erasable memory, writeable or re-writeable memory, and the like. For example, the machine-readable storage medium may include, RAM, DRAM, Double-Data-Rate DRAM (DDR-DRAM), SDRAM, static RAM (SRAM), ROM, programmable ROM (PROM), erasable programmable ROM (EPROM), electrically erasable programmable ROM (EEPROM), Compact Disk ROM (CD-ROM), Compact Disk Recordable (CD-R), Compact Disk Rewriteable (CD-RW), flash memory (e.g., NOR or NAND flash memory), content addressable memory (CAM), polymer memory, phase-change memory, ferroelectric memory, silicon-oxide-nitride-oxide-silicon (SONOS) memory, a disk, a floppy disk, a hard drive, an optical disk, a magnetic disk, a card, a magnetic card, an optical card, a tape, a cassette, and the like. The computer-readable storage media may include any suitable media involved with downloading or transferring a computer program from a remote computer to a requesting computer carried by data signals embodied in a carrier wave or other propagation medium through a communication link, e.g., a modem, radio or network connection.

In some demonstrative embodiments, the logic may include instructions, data, and/or code, which, if executed by a machine, may cause the machine to perform a method, process and/or operations as described herein. The machine may include, for example, any suitable processing platform, computing platform, computing device, processing device, computing system, processing system, computer, processor, or the like, and may be implemented using any suitable combination of hardware, software, firmware, and the like.

In some demonstrative embodiments, the logic may include, or may be implemented as, software, a software module, an application, a program, a subroutine, instructions, an instruction set, computing code, words, values, symbols, and the like. The instructions may include any suitable type of code, such as source code, compiled code, interpreted code, executable code, static code, dynamic code, and the like. The instructions may be implemented according to a predefined computer language, manner or syntax, for instructing a processor to perform a certain function. The instructions may be implemented using any suitable high-level, low-level, object-oriented, visual, compiled and/or interpreted programming language, such as C, C++, Java, BASIC, Matlab, Pascal, Visual BASIC, assembly language, machine code, and the like.

Functions, operations, components and/or features described herein with reference to one or more embodiments, may be combined with, or may be utilized in combination with, one or more other functions, operations, components and/or features described herein with reference to one or more other embodiments, or vice versa.

While certain features of the invention have been illustrated and described herein, many modifications, substitutions, changes, and equivalents may occur to those skilled in the art. It is, therefore, to be understood that the appended claims are intended to cover all such modifications and changes as fall within the true spirit of the invention.

What is claimed is:

1. A method of retrieving search results according to priorities from a plurality of database servers, using parallel computation performed by a plurality of said servers for a common query, the method comprises: i. receiving by a database server one or more search criteria related to a query, ii. searching by said database server search results from a locally associated database according to a predetermined search process for said search criteria related to the query, iii. associating by said database server priority discrimination levels with said search results, wherein priority discrimination levels are common to said plurality of database servers, and wherein a priority discrimination level refers to one or more search criteria that discriminate one or more search results from other search results, and wherein more restricting criteria are associated with higher priority discrimination levels, iv. transmitting by said database server for each priority discrimination level associated with search results, a signal in a respective communication slot assigned to a priority discrimination level for which the database server associates one or more search results in stage (iii), v. identifying by said database server indication on valid priority discrimination levels, wherein valid priority discrimination levels are detected by a detector that detects transmission performed within stage (iv) in different communication slots, and wherein transmission in a communication slot which is assigned to a priority discrimination level is indicative on a valid priority discrimination level, vi. transmitting by said database server search results associated with valid priority discrimination level according to priority determined by valid priority discrimination levels identified in stage (v).

2. A method according to claim 1, wherein criteria in stage (i) include a plurality of levels according to which search results are discriminated.

3. A method according to claim 1, wherein transmission by database servers in said communication slot assigned to a priority discrimination level is preferably a synchronized transmission performed simultaneously by database servers having in common a respective priority discrimination level.

4. Apparatus to implement said method according to claim 1, comprising a common server and database servers connected to a common network and wherein each database server is associated with a local database.

5. A method according to claim 1 wherein identifying valid priority levels in stage (v) is performed by a common detector that detects transmitted signals performed in stage (iv) and transmits a message with detected valid priority discrimination levels to database servers according to which database servers identify valid priority levels in stage (v).

6. A method according to claim 4, wherein said common server is comprised of one or more servers sharing more than one task of controlling the transmission of data items from database servers according to priorities.

7. A method according to claim 1, wherein said search query in stage (i) is transmitted by a common server to a plurality of said database servers through a broadcast message.

8. A method according to claim 1, wherein said priority discrimination levels in stage (iii) are transmitted by a common server to a plurality of database servers.

9. A method according to claim 1 wherein, said priority discrimination levels, assigned to communication slots for signal transmission by database servers, are determined by a common server and transmitted to a plurality of said database servers.

10. A method according to claim 1, wherein multi-carrier OFDM (Orthogonal Frequency Division Multiplex) based transmission is used to transmit multiple signals in stage (iv), wherein a sub-carrier of the multi-carrier corresponds to a said communication slot assigned to a priority discrimination level.

11. A method according to claim 1, wherein a common synchronization signal is received by the database servers to synchronize signals transmitted by database servers in stage (iv).

12. A method according to claim 1 wherein identifying valid priority levels by stage (v) is according to detection results of a detector associated with the database server that listens to transmitted signals performed in stage (iv) and accordingly said indication on valid priority levels are identified by database servers.

13. A method according to claim 12 wherein a refinement to priority discrimination levels is performed before stage (vi), as a further phase of preliminary priority mapping process, by repeating stages (iii) (iv) and (v), according to a process in the database servers that also determines refined and more restricted common priority discrimination levels assigned to communication slots.

14. A method according to claim 5 wherein, said common detector is associated with a common server.

15. A method according to claim 1 wherein stages (iii) (iv) and (v) are repeated by a further phase of preliminary priority mapping process that determines new priority discrimination levels with higher resolution for a more restricted range of priority levels.

16. A method according to claim 1 wherein assignment of communication slots is received as a message by database servers before stage (iv), and accordingly stages (iii) and (iv) are repeated by a further phase of preliminary priority mapping process that determines new priority discrimination levels with higher resolution for a more restricted range of priority levels.

17. A method according to claim 1 wherein communication slots, assigned to priority discrimination levels, are allocated dynamically to database servers.

18. A method according to claim 1 wherein prioritized communication in stage (vi) is performed according to a predetermined prioritized contention resolution based access method, wherein access priority is provided to database servers according to said valid priority discrimination levels.

* * * * *